(12) United States Patent
Tsuji (10) Patent No.: US 12,204,030 B2
(45) Date of Patent: Jan. 21, 2025

(54) DETECTION APPARATUS, DETERMINATION METHOD, AND NON-TRANSITORY COMPUTER READABLE MEDIUM STORING PROGRAM (71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 994 days.

(21) Appl. No.: 17/273,497

(22) PCT Filed: Sep. 6, 2018

(86) PCT No.: PCT/JP2018/033016
§ 371 (c)(1),
(2) Date: Mar. 4, 2021

(87) PCT Pub. No.: WO2020/049682
PCT Pub. Date: Mar. 12, 2020

(65) Prior Publication Data
US 2021/0318433 A1 Oct. 14, 2021

(51) Int. Cl.
*G01C 3/08* (2006.01)
*G01S 7/48* (2006.01)
(Continued)

(52) U.S. Cl.
CPC ............ *G01S 17/89* (2013.01); *G01S 7/4808* (2013.01); *G01S 17/06* (2013.01); *G06V 10/44* (2022.01);
(Continued)

(58) Field of Classification Search
CPC ........ G01S 17/89; G01S 17/06; G01S 7/4808; G06V 10/758; G06V 10/762; G06V 10/44; G06V 20/64
See application file for complete search history.

(56) References Cited

U.S. PATENT DOCUMENTS

2015/0088466 A1* 3/2015 Zhang .................... G06T 17/05
703/1
2016/0014328 A1 1/2016 Rokutanda
2020/0193606 A1* 6/2020 Douillard .............. G01S 17/931

FOREIGN PATENT DOCUMENTS

CN    104298971    * 9/2017 ....... G06F 18/23213
JP    2012-093334 A    5/2012
(Continued)

OTHER PUBLICATIONS

International Search Report for PCT Application No. PCT/JP2018/033016, mailed on Nov. 20, 2018.
(Continued)

Primary Examiner — Mark Hellner
(74) Attorney, Agent, or Firm — Sughrue Mion, PLLC (57) ABSTRACT An object is to provide a detection apparatus, a determination method, and a program capable of distinguishing a natural object from a structure and thereby detecting the natural object. A detection apparatus (10) according to the present disclosure includes a calculation unit (11) configured to calculate a normal vector for each point included in point-group data indicating a distance to an object to be determined by using the point-group data, and a determination unit (12) configured to determine whether the object to be determined is a natural object or not by using a distribution state of at least either horizontal components of the normal vectors or vertical components thereof.

15 Claims, 9 Drawing Sheets (51) Int. Cl.
   *G01S 17/06*    (2006.01)
   *G01S 17/89*    (2020.01)
   *G06V 10/44*    (2022.01)
   *G06V 10/75*    (2022.01)
   *G06V 10/762*   (2022.01)
   *G06V 20/64*    (2022.01)

(52) U.S. Cl.
   CPC .......... *G06V 10/758* (2022.01); *G06V 10/762* (2022.01); *G06V 20/64* (2022.01)

(56) References Cited

FOREIGN PATENT DOCUMENTS

| | | | | |
|---|---|---|---|---|
| JP | 2014-188223 A | 10/2014 | | |
| JP | 2018-071973 A | 5/2018 | | |
| WO | WO 2011120152 A1 * | 10/2011 | ............. | G01C 11/00 |

OTHER PUBLICATIONS

Du, Shouji et al., "Automatic building extraction from LIDAR data fusion of point and grid-based features", ISPRS Journal of Photogrammetry and Remote Sensing, Jun. 27, 2017, 130(2017), pp. 294-307.
Yani Ioannou et al., "Difference of Normals as a Multi-Scale Operator in Unorganized Point Clouds", Proceedings of the 2012 Second International Conference on 3D Imaging, Modeling, Processing, Visualization & Transmission (3DIMPVT), Sep. 8, 2012.

* cited by examiner

DETECTION APPARATUS, DETERMINATION METHOD, AND NON-TRANSITORY COMPUTER READABLE MEDIUM STORING PROGRAM

This application is a National Stage Entry of PCT/JP2018/033016 filed on Sep. 6, 2018, the contents of all of which are incorporated herein by reference, in their entirety.

TECHNICAL FIELD

The present disclosure relates to a detection apparatus, a determination method, and a program.

BACKGROUND ART

In recent years, construction of a system for monitoring a facility by using LiDAR (Light Detection And Ranging) has been studied. The LiDAR is a technology by which a distance from a monitoring apparatus to an object to be monitored can be measured, so that the shape of the object can be scanned. For example, a ToF (Time of Flight) method is applied in the LiDAR. In the LiDAR to which the ToF method is applied, light is emitted from a monitoring apparatus to an object to be monitored. Then, the monitoring apparatus receives reflected light of the emitted light. The monitoring apparatus to which the LiDAR is applied measures a distance to the object to be monitored by using a time from when light is emitted to when reflected light is received and the speed of light.

It has been desired to detect an abnormality that has occurred in a facility by monitoring the facility by using the LiDAR. If it is possible to detect an abnormality that has occurred in a facility, it becomes possible to operate the facility in a normal state by eliminating the detected abnormality.

Non-patent Literature 1 discloses a technique for detecting a plane and an edge by using normal vectors. Specifically, Non-patent Literature 1 discloses that normal vectors are calculated from point-group data indicating a distance from a monitoring apparatus to an object. Further, Non-patent Literature 1 discloses that a plane of the object is detected by calculating a curvature using normal vectors. Further, Non-patent Literature 1 discloses that a boundary between objects is specified by detecting a part where the degree of change in curvature is larger than a predetermined value as an edge.

Patent Literature 1 discloses that a bit pattern of a surface of a living body is generated by using normal vectors. Further, Patent Literature 2 discloses that a relative vector of points that are adjacent to each other on the same scanning line is calculated and a damaged part is determined according to the variation of the relative vector.

CITATION LIST

Patent Literature

Patent Literature 1: Japanese Unexamined Patent Application Publication No. 2014-188223
Patent Literature 2: Japanese Unexamined Patent Application Publication No. 2018-071973

Non Patent Literature

Non-patent Literature 1: Yani Ioannou, others: 3, "Difference of Normals as a Multi-Scale Operator in Unorganized Point Clouds" Proceedings of the 2012 Second International Conference on 3D Imaging, Modeling, Processing, Visualization & Transmission (3DIMPVT) Sep. 8, 2012

SUMMARY OF INVENTION

Technical Problem

It has been desired to detect, as an abnormality occurring in a facility, a natural object such as a bird's nest sticking to a structure such as a building. Specifically, bird's nests are sometimes formed in power stations, substations, utility poles, and the like. In such cases, the bird's nest may cause a power outage. However, there is a problem that even if any of the techniques disclosed in Non-patent Literatures 1, Patent Literature 1, and Patent Literature 2 is used, it is impossible to distinguish a natural object from a structure such as a building and thereby to detect the natural object.

An object of the present disclosure is to provide a detection apparatus, a determination method, and a program capable of distinguishing a natural object from a structure and thereby detecting the natural object.

Solution to Problem

A detection apparatus according to a first aspect of the present disclosure includes: a calculation unit configured to calculate a normal vector for each point included in point-group data indicating a distance to an object to be determined by using the point-group data; and a determination unit configured to determine whether the object to be determined is a natural object or not by using a distribution state of at least either horizontal components of the normal vectors or vertical components thereof.

A determination method according to a second aspect of the present disclosure is performed in a detection apparatus, the determination method including: calculating a normal vector for each point included in point-group data indicating a distance to an object to be determined by using the point-group data; and determining whether the object to be determined is a natural object or not by using a distribution state of at least either horizontal components of the normal vectors or vertical components thereof.

A program according to a third aspect of the present disclosure causes a computer to: calculate a normal vector for each point included in point-group data indicating a distance to an object to be determined by using the point-group data; and determine whether the object to be determined is a natural object or not by using a distribution state of at least either horizontal components of the normal vectors or vertical components thereof.

Advantageous Effects of Invention

According to the present disclosure, it is possible to provide a detection apparatus, a determination method, and a program capable of distinguishing a natural object from a structure and thereby detecting the natural object.

DESCRIPTION OF EMBODIMENTS

First Example Embodiment

Example embodiments according to the present disclosure will be described hereinafter with reference to the drawings. An example of a configuration of a detection apparatus 10 according to a first example embodiment will be described with reference to FIG. 1. The detection apparatus 10 may be a computer apparatus that operates by having a processor execute a program stored in a memory. The detection apparatus 10 may be, for example, a group of apparatuses composed of a plurality of computer apparatuses.

Figure 1:
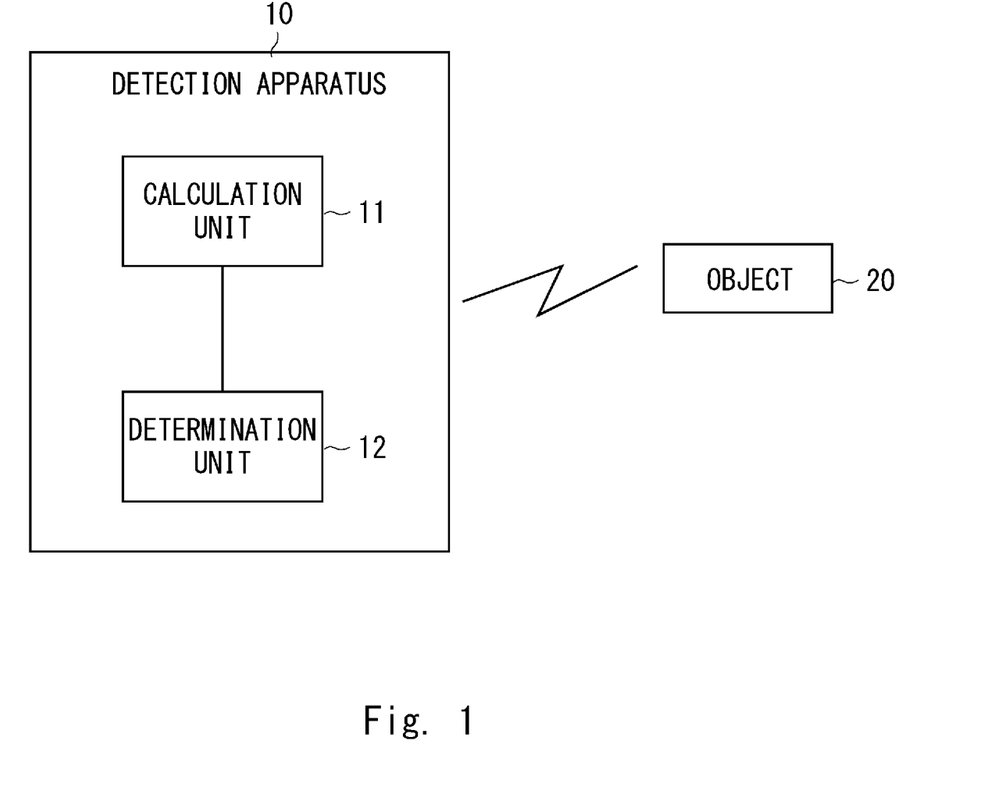
FIG. 1 is a configuration diagram of a detection apparatus according to a first example embodiment.

The detection apparatus 10 includes a calculation unit 11 and a determination unit 12. The calculation unit 11 and the determination unit 12 may be software or modules by which processing is performed as a processor executes a program stored in a memory. Alternatively, the calculation unit 11 and the determination unit 12 may be hardware such as a circuit or a chip.

The calculation unit 11 calculates a normal vector for each point included in point-group data indicating a distance to an object 20 to be determined by using the point-group data. The object 20 is, for example, a natural object or a structure. The natural object may be an object having no specific shape, such as a bird's nest. In other words, the natural object may be an object that cannot be identified based on a predetermined shape. In still other words, it is considered that the natural object does not have regularity in the arrangement of its components such as its material, and has a random shape. The specific shape may be, for example, a rectangular shape, a circular shape, or the like having various sizes, or may have a structure obtained by combining a rectangular shape(s) and a circular shape(s). Further, the specific shape may be a geometric shape or a geometric pattern. Further, the specific shape may be a shape having predetermined regularity in the arrangement of components of the object such as a material of the object. The structure is, for example, an architectural object such as a building and a steel tower, and may be a manmade object having a specific shape.

The point-group data may be, for example, data having information about a distance calculated by using a TOF method. The shape of the object 20 is specified by using point-group data having information about a distance between the detection apparatus 10 and the object 20.

Further, the point-group data may be data having 3D (three-dimensional) data. For example, the point-group data may be 3D data having components on X-, Y-, and Z-axes that are orthogonal to each other. The 3D data may also be referred to as coordinates or coordinate data. The shape of the object 20 may be specified by using 3D data.

The point-group data may be acquired or calculated by using, for example, LiDAR. Alternatively, the point-group data may be acquired or calculated by using a 3D sensor. The 3D sensor may be, for example, a range camera, a range sensor, a distance measuring sensor, or the like. The detection apparatus 10 may be equipped with a function or a unit for acquiring point-group data by using LiDAR or a 3D sensor. Alternatively, the detection apparatus 10 may acquire point-group data that is measured or calculated by other apparatuses.

A known method may be used as the method for calculating a normal vector from point-group data, and therefore its detailed description is omitted.

The determination unit 12 determines whether the object 20 is a natural object or not by using a distribution state of at least either horizontal components of normal vectors or vertical components thereof. A horizontal component and a vertical component of a normal vector will be described by using, for example, 3D coordinates shown in FIG. 2. The 3D coordinates are expressed by using, for example, coordinates (components) on X-, Y-, and Z-axes that are orthogonal to each other, and a distance (d) from the origin to a point P. Note that the vertical component may be, for example, information indicating an angle ($\theta$) between an XY-plane and a normal vector. Further, the horizontal component may be, for example, information indicating an angle ($\varphi$) between a projected line or vector obtained by projecting the normal vector onto the XY-plane, which is a plane orthogonal to the Z-axis, and the X-axis. In other words, the horizontal and vertical components of the normal vector may be expressed as angular coordinates specified in a spherical coordinate system.

Figure 2:
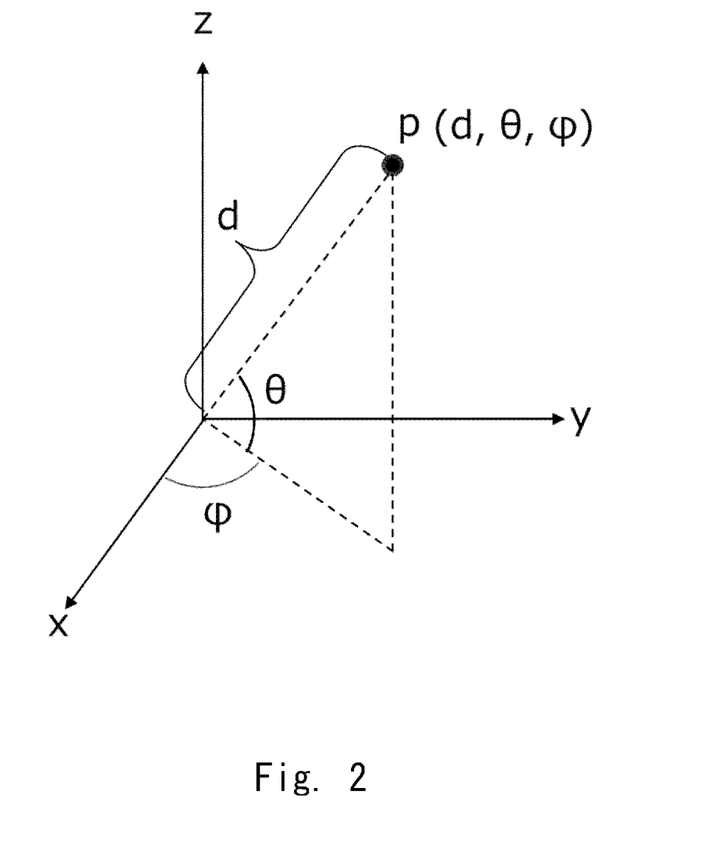
FIG. 2 is a diagram for explaining a horizontal component and a vertical component of a normal vector according to the first example embodiment.

The distribution state may indicate, for example, the number of points having the same horizontal component or the number of points having the same vertical component. Alternatively, the distribution state may indicate the number of points included in horizontal components within a predetermined range or vertical components within a predetermined range. Alternatively, the distribution state may be a distribution of points on a plane that is determined by horizontal components and vertical components.

For example, the determination unit 12 may determine that the object 20 is a structure when its distribution state satisfies a predetermined criterion, and may determine that the object 20 is a natural object when the distribution state does not satisfy the predetermined criterion. Alternatively, the determination unit 12 may determine that the object 20 is a natural object when its distribution state satisfies a predetermined criterion, and may determine that the object 20 is a structure when the distribution state does not satisfy the predetermined criterion.

As described above, the detection apparatus 10 according to the first example embodiment can determine whether the object 20 is a natural object or not based on the distribution state of at least either horizontal components of normal vectors or vertical components thereof calculated from point-group data. That is, the detection apparatus 10 can identify a natural object present in a structure.

Second Example Embodiment

Next, an example of a configuration of a detection apparatus 30 according to a second example embodiment will be described with reference to FIG. 3. The detection apparatus 30 includes a calculation unit 31, a determination unit 32, a shape change area extraction unit 33, a clustering execution unit 34, an output unit 35, and a point-group data holding unit 36. The calculation unit 31, the determination unit 32, the shape change area extraction unit 33, the clustering execution unit 34, the output unit 35, and the point-group data holding unit 36 may be software or modules by which processing is performed as a processor executes a program stored in a memory. Alternatively, the calculation unit 31, the determination unit 32, the shape change area extraction unit 33, the clustering execution unit 34, the output unit 35, and the point-group data holding unit 36 may be hardware such as a circuit or a chip. Alternatively, the point-group data holding unit 36 may be a memory or a hard disk drive.

The calculation unit 31 corresponds to the calculation unit 11 shown in FIG. 1, and the determination unit 32 corresponds to the determination unit 12 shown in FIG. 1. Therefore, detailed descriptions of the functions or the operations of the calculation unit 31 and the determination unit 32 that are the same as those of the calculation unit 11 and the determination unit 12 are omitted.

The point-group data holding unit 36 holds point-group data indicating a distance from the detection apparatus 30 to an object 20 to be monitored. The point-group data held in the point-group data holding unit 36 may be data measured or calculated by the detection apparatus 30 or data measured or calculated by other apparatuses. When the point-group data holding unit 36 acquires data measured or calculated by other apparatuses, it may acquire the data through a wireless line or a wired line. Alternatively, when the point-group data holding unit 36 acquires data measured or calculated by other apparatuses, it may acquire point-group data by reading data recorded in a portable recording medium.

The calculation unit 31 calculates normal vectors by using the point-group data held in the point-group data holding unit 36. Further, the calculation unit 31 calculates a curvature from the normal vectors. Specifically, the calculation unit 31 calculates a curvature of a predetermined plane by using normal vectors for points included in the plane. Alternatively, the calculation unit 31 calculates a curvature of a predetermined curved line by using normal vectors for points included in the curved line. A known method may be used as the method for calculating a curvature from normal vectors, and therefore its detailed description is omitted.

The shape change area extraction unit 33 extracts an area where the shape of the object changes by using the normal vectors and the curvature calculated by the calculation unit 31. The area where the shape of the object changes may be, for example, an area indicating an edge (a boundary) of the object. For example, the shape change area extraction unit 33 extracts an area where the curvature is larger than a predetermined threshold. The shape change area extraction unit 33 can specify a boundary of the object by extracting an area where the curvature is larger than the predetermined threshold. In other words, the shape change area extraction unit 33 can specify the shape of the object.

The clustering execution unit 34 performs clustering for the point group held in the point-group data holding unit 36 according to the result of the extraction of the area in the shape change area extraction unit 33. For example, the clustering execution unit 34 may determine that a point group included in the extracted area is one and the same cluster. Alternatively, the clustering execution unit 34 may determine that a point group in which distances between points are equal to or shorter than a predetermined threshold is one and the same cluster. The determination of one and the same cluster by the clustering execution unit 34 may also be expressed as generating a cluster. The clustering execution unit 34 may generate a plurality of clusters.

The determination unit 32 determines, for each cluster generated by the clustering execution unit 34, whether an object included in the cluster is a natural object or not. Alternatively, the determination unit 32 may determine whether an object included in a plurality of clusters in which clusters are combined with one another is a natural object or not. The determination unit 32 uses, for example, a distribution state of horizontal components or vertical components of normal vectors of points constituting each cluster.

A process in which the determination unit 32 determines whether an object is a natural object or not by using a distribution state of horizontal components will be described hereinafter.

Figure 4:
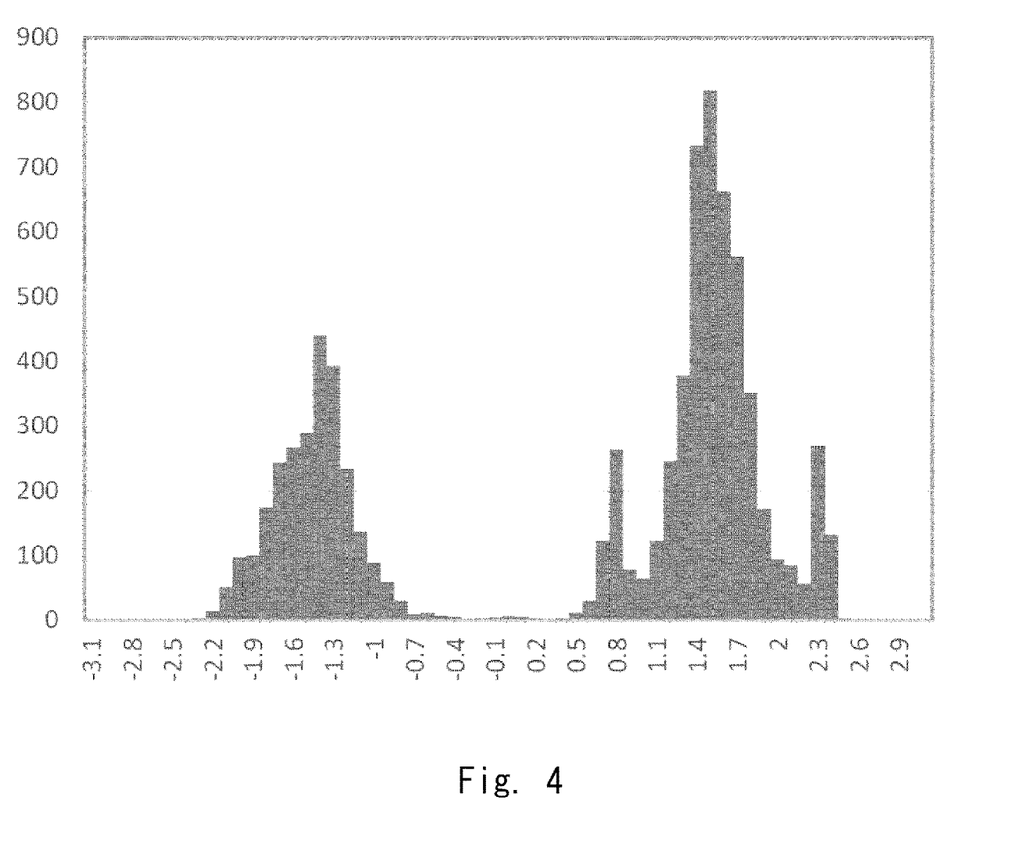
FIG. 4 is a histogram showing a distribution state of horizontal components according to the second example embodiment.
Figure 5:
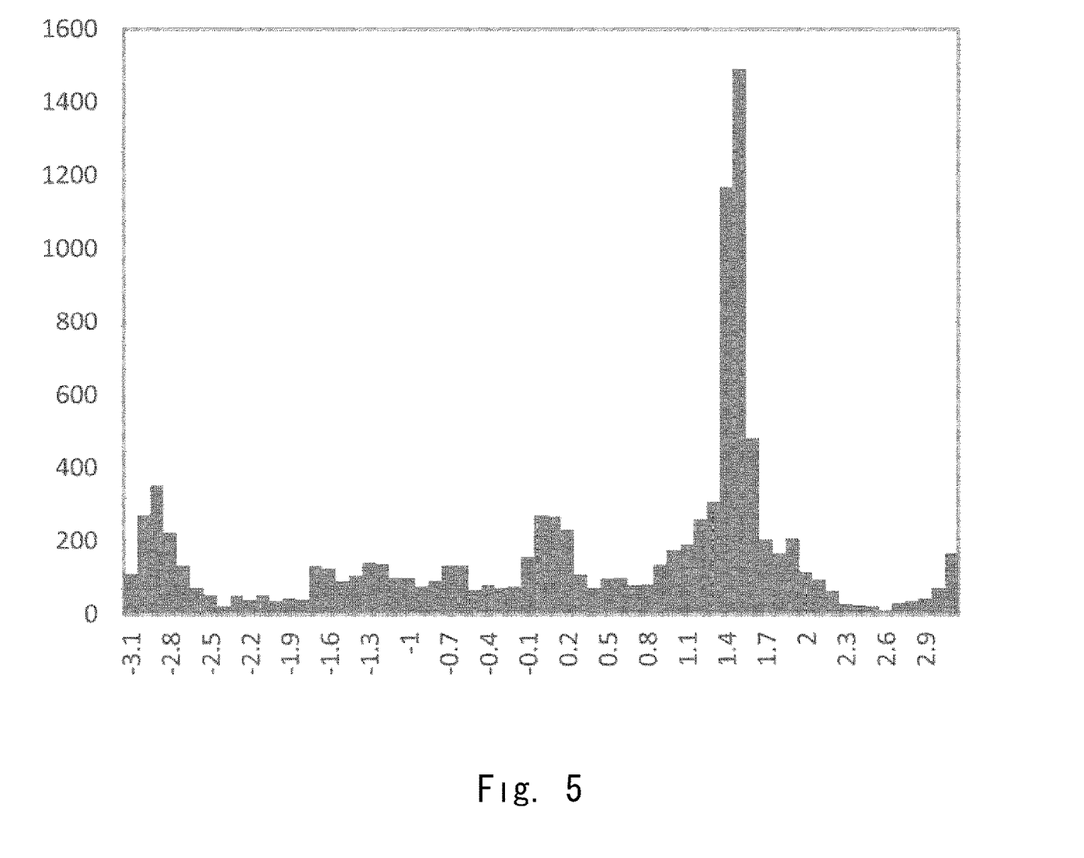
FIG. 5 is a histogram showing a distribution state of horizontal components according to the second example embodiment.

Each of FIGS. 4 and 5 shows a distribution state of horizontal components in the form of a histogram. In other words, each of FIGS. 4 and 5 shows a distribution tendency of horizontal components of normal vectors. Each of the histograms shown in FIGS. 4 and 5 shows a relation between angles representing horizontal components and the numbers of occurrences of the respective angles. The number of occurrences of each of the angles may also be referred to as the number of points indicating that angle. The angles representing horizontal components are shown by using a horizontal axis, and the numbers of occurrences are shown by using a vertical axis. Radians are used as the unit for horizontal components. FIG. 4 is a histogram showing a structure, and FIG. 5 is a histogram showing a natural object.

FIG. 4 shows two peaks at each of which the number of occurrences is equal to or larger than A (A is a positive integer). A peak indicates a part where points are concentrated in the histogram. Meanwhile, FIG. 5 shows one peak at which the number of occurrences is equal to or larger than A. It is assumed that the value of A is, for example, 400. The determination unit 32 may determine whether the object is a natural object or not according to the number of peaks appearing in the histogram. The value of A, which is used to determine a peak, may be changed by an administrator or the like. For example, when two or more peaks are included in the histogram, the determination unit 32 may determine that the object shown in the histogram is a structure, whereas when the number of peaks is smaller than two, the determination unit 32 may determine that the object shown in the histogram is a natural object. The fact that the number of peaks is large indicates that a large number of normal vectors point to a certain direction, hence it is inferred that it indicates a characteristic of a structure. Further, when the number of peaks is small, normal vectors point to various directions, hence it is inferred that it indicates a characteristic of a natural object. The fact that the number of peaks is large means that the number of peaks is larger than a predetermined number, and the fact that the number of peaks is small means that the number of peaks is smaller than the predetermined number.

Further, in FIG. 4, most of the points are distributed in two areas, i.e., an area between an angle B and an angle C and an area between an angle D and an angle E. It is assumed that the two areas are, for example, an area between −2.2 radians and 0.7 radians and an area between 0.5 radians and 2.3 radians. Meanwhile, in FIG. 5, points are distributed over the whole angles shown in the histogram. The determination unit 32 may determine whether the object is a natural object or not according to the range in which points are distributed. For example, the determination unit 32 may determine that the object is a natural object when the area or the range in which points are distributed is F degrees (F is a positive value) or larger, and may determine that the object is a structure when the area or the range is smaller than F degrees. The fact that the number of areas where points are distributed is small means that a large number of normal vectors point to a certain direction, and hence it is inferred that it indicates a characteristic of a structure. Further, the fact that the number of areas where points are distributed is large, normal vectors point to various directions, hence it is inferred that it indicates a characteristic of a natural object. The fact that the number of areas where points are distributed is large means that the number of areas where points are distributed is larger than a predetermined number of ranges, and the fact that the number of areas where points are distributed is small means that the number of areas where points are distributed is smaller than the predetermined number of ranges.

Further, the determination unit 32 may determine whether the object is a natural object or not by using a variance value of the points shown in the histogram. For example, the determination unit 32 may determine that the object is a natural object when the variance value is equal to or larger than a predetermined threshold, and may determine that the object is a structure when the variance value is smaller than the predetermined threshold.

Further, the determination unit 32 may determine whether the object is a natural object or not by using a degree of coincidence between a distribution of points and a predetermined distribution model. The predetermined distribution model may be, for example, a normal distribution, or may be a learning model indicating a structure or a natural object that is generated through machine learning. Regarding the degree of coincidence, for example, when an area where a curved line that approximately represents a distribution of points coincides with the predetermined distribution model is G degrees (G is a positive value) or larger, it may be determined that the object is a structure, whereas when the area is smaller than G degrees, it may be determined that the object is a natural object. Alternatively, the degree of coincidence may be determined by using the tendency of the change in inclination of a curved line approximately representing the distribution of points and the tendency of the change in inclination of a curved line approximately representing the predetermined distribution model.

The output unit 35 outputs the result of the determination made by the determination unit 32. The output unit 35 may, for example, output image data which has been processed so that the area, which has been determined as a natural object, is emphasized to a display or the like. The emphasizing process may be a process by which, for example, the area containing the natural object is colored by a color(s) different from those of the other areas. Alternatively, the emphasizing process may be a process by which the area containing the natural object is encircled by straight lines, curved lines, or the like.

Alternatively, the output unit 35 may output a text message indicating that a natural object is included in the area to a display or the like. Alternatively, the output unit 35 may output a warning sound or the like from a speaker or the like when a natural object is included in the area.

Further, although FIGS. 4 and 5 show histograms for horizontal components of normal vectors, the determination unit 32 may determine whether the object is a natural object or not by using a histogram for vertical components of normal vectors.

Figure 6:
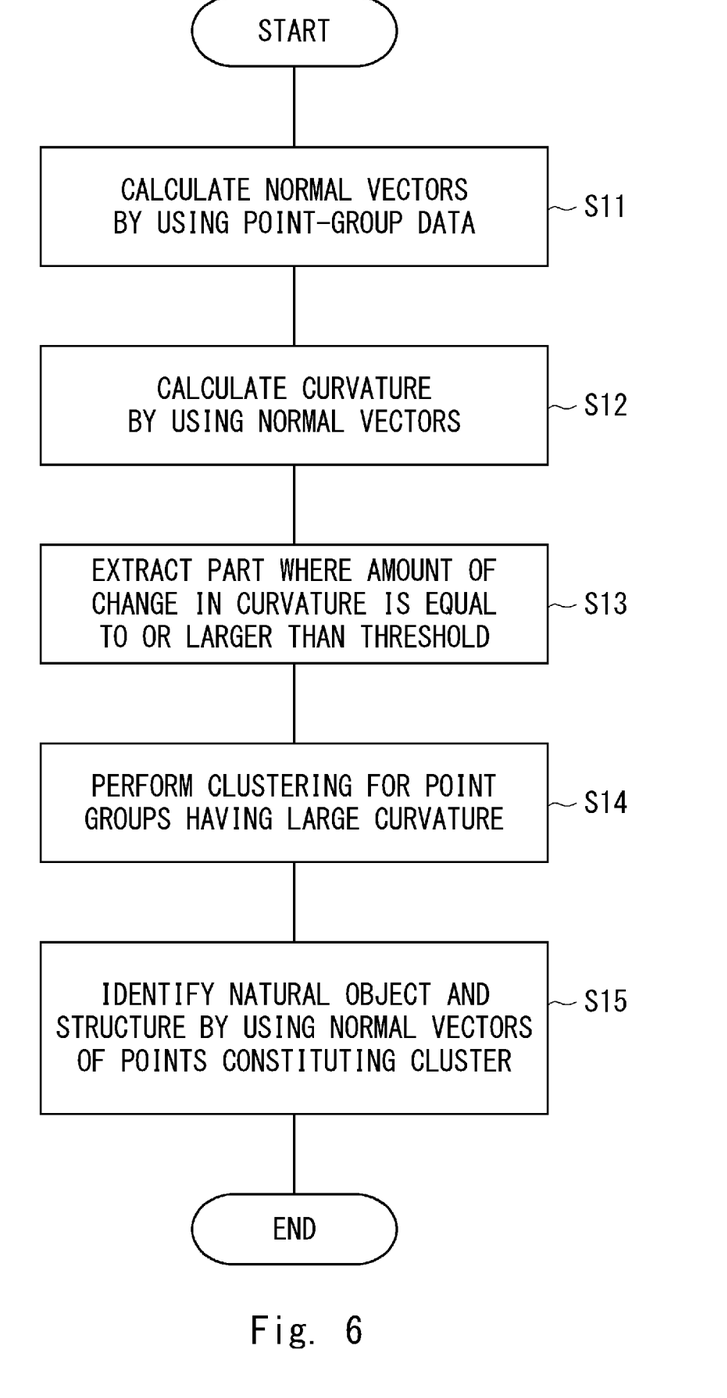
FIG. 6 is a diagram showing a flow of determination processes performed in the detection apparatus according to the second example embodiment.

Next, a flow of a determination process performed in the detection apparatus 30 according to the second example embodiment will be described with reference to FIG. 6.

Firstly, the calculation unit 31 calculates normal vectors by using point-group data (S11). The calculation unit 31 calculates a normal vector for each point included in the point-group data.

Next, the calculation unit 31 calculates a curvature of a predetermined area or a predetermined plane by using the normal vectors calculated in the step S11 (S12). The calculation unit 31 calculates curvatures of a plurality of areas or a plurality of planes.

Next, the shape change area extraction unit 33 extracts a part(s) where the degree of change in curvature is equal to or larger than a predetermined threshold (S13). The part where the degree of change in curvature is equal to or larger than the threshold is a part where the shape of the object drastically changes. That is, the part where the degree of change in curvature is equal to or larger than the threshold indicates a boundary of the object.

Next, the clustering execution unit 34 performs clustering for point groups included in the area where the degree of change in curvature is equal to or larger than the predetermined threshold (S14). That is, the clustering execution unit 34 performs clustering for the point groups in the areas extracted in the step S13.

Next, the determination unit 32 determines whether an object included in the cluster formed in the step S14 is a natural object or not by using a distribution state of either horizontal components of normal vectors of points constituting the cluster or vertical components thereof (S15). That is, the determination unit 32 determines whether the object included in the cluster is a natural object or a structure.

As described above, the detection apparatus 30 according to the second example embodiment can perform an analytic process by using a histogram indicating either horizontal components of normal vectors or vertical components thereof. As a result of the analytic process using the histogram, the detection apparatus 30 can determine or identify whether the object included in the cluster is a natural object or a structure. As a result, the detection apparatus 30 can detect or discover a natural object included in the structure.

Third Example Embodiment

Figure 7:
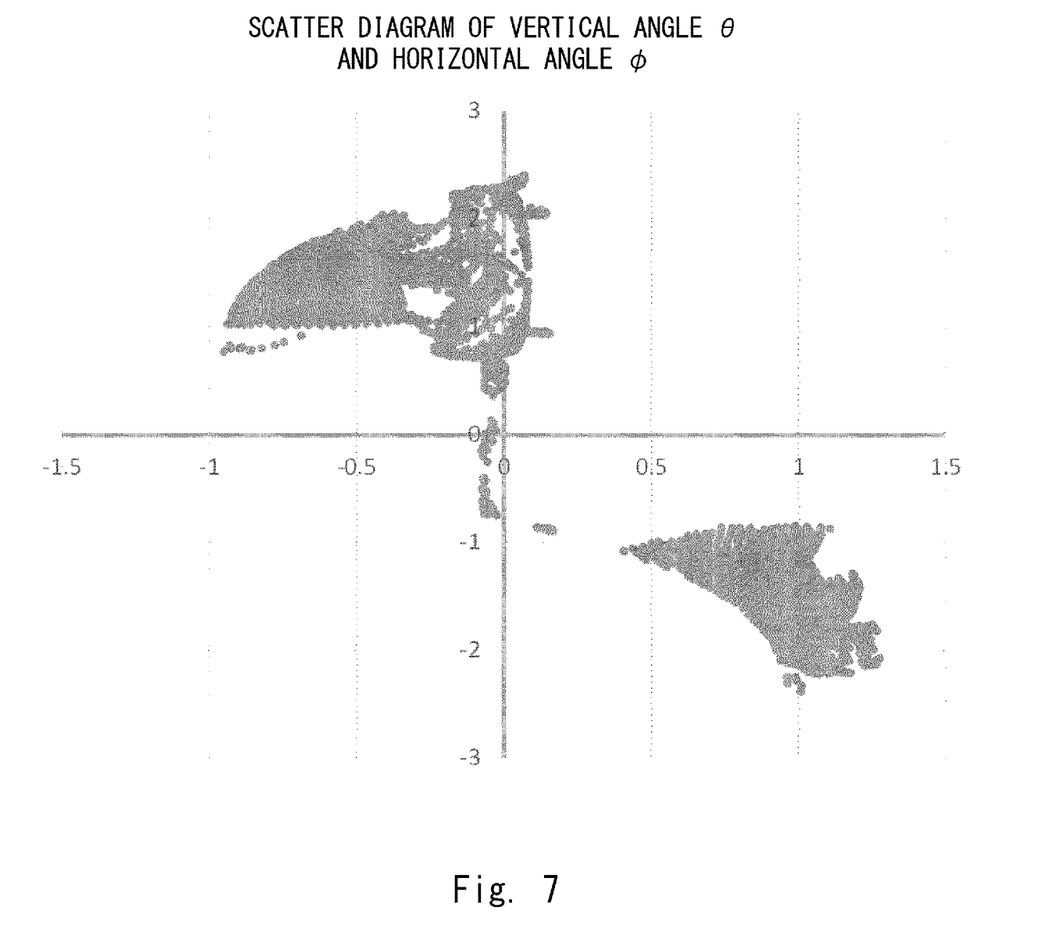
FIG. 7 shows a distribution of points using horizontal components and vertical components according to a third example embodiment.
Figure 8:
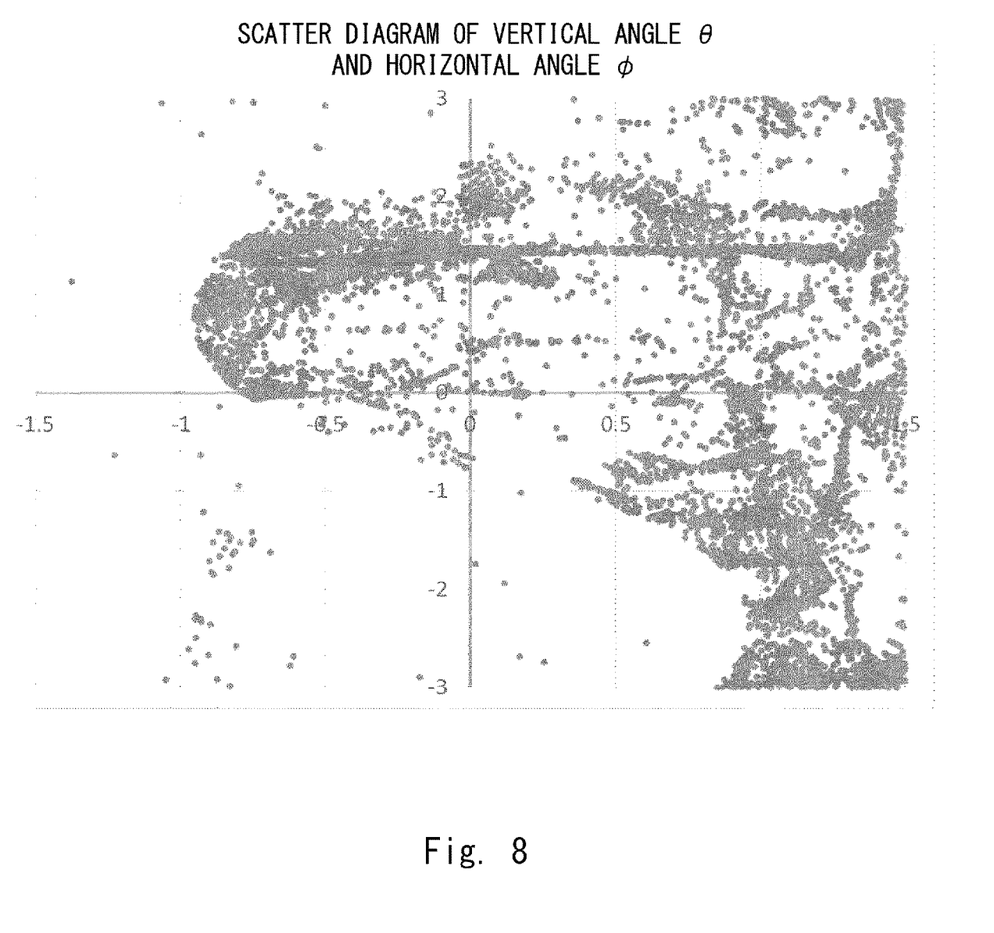
FIG. 8 shows a distribution of points using horizontal components and vertical components according to the third example embodiment.

Next, a determination process performed by the determination unit 32 of the detection apparatus 30 according to a third example embodiment will be described with reference to scatter diagrams shown in FIGS. 7 and 8. Each of FIGS. 7 and 8 shows a plane using an axis indicating horizontal components of normal vectors and an axis indicating vertical components thereof. Radians are used as the unit for each axis. In other words, each of FIGS. 7 and 8 shows a distribution tendency of horizontal components and vertical components of normal vectors. That is, each of FIGS. 7 and 8 shows a distribution of points included in a point group by using horizontal components and vertical components of normal vectors. FIG. 7 shows a distribution state showing a structure, and FIG. 8 shows a distribution state showing a natural object.

The determination unit 32 may determine that an object is a structure when the distribution of points is concentrated in a certain area, and may determine that the object is a natural object when the distribution of points is scattered over a wide range. For example, the determination unit 32 may determine that the object is a natural object when the size of the area where points are distributed exceeds a predetermined threshold, and may determine that the object is a structure when the size does not exceed the predetermined threshold. For example, when FIG. 7 is compared with FIG. 8, it can be understood that the distribution of points is scattered over a wider range in FIG. 7. That is, the size of the distribution area of points in FIG. 8 is larger than the size of the distribution area of points in FIG. 7.

The fact that the distribution of points is concentrated in a certain area indicates that a large number of normal vectors point to a certain direction, hence it is inferred that it indicates a characteristic of a structure. Further, the fact that the distribution of points is scattered over a wide range indicates that normal vectors point to various directions, hence it is inferred that it indicates a characteristic of a natural object.

If the threshold is present between the size of the distribution area of points in FIG. 7 and the size of the distribution area of points in FIG. 8, the determination unit 32 may determine that the object shown in FIG. 7 is a structure and determine that the object shown in FIG. 8 is a natural object.

Further, the determination unit 32 may calculate a correlation coefficient indicating a relation between horizontal components and vertical components both of which are variables. As the correlation coefficient, a value that is no smaller than −1 and no larger than 1 is used. It can be said that the closer the absolute value of the correlation coefficient is to 1, the larger the correlation is between horizontal components and vertical components. Conversely, the closer the absolute value is to 0, the smaller the correlation is.

The large correlation indicates that a large number of normal vectors point to a certain direction, hence it is inferred that it indicates a characteristic of a structure. Further, the small correlation indicates that normal vectors point to various directions, hence it is inferred that it indicates a characteristic of a natural object.

The determination unit 32 may determine that the object is a structure when the absolute value of the calculated correlation coefficient exceeds a predetermined value, and may determine that the object is a natural object when the absolute value of the correlation coefficient does not exceed the predetermined value.

Further, the determination unit 32 may calculate a curved line approximately representing the distribution of points included in a point group, and determine whether the object is a structure or a natural object according to the degree of change in inclination of the approximate curved line. For example, the determination unit 32 may determine that the object is a natural object when the degree of change in inclination exceeds a predetermined threshold, and may determine that the object is a structure when the degree of change in inclination does not exceed the predetermined threshold.

As described above, the determination unit 32 of the detection apparatus 30 can analyze the distribution state of points on a plane that is determined by horizontal components and vertical components of normal vectors. As a result of the analysis of the distribution state of points, the detection apparatus 30 can determine or identify whether the object included in the cluster is a natural object or a structure. As a result, the detection apparatus 30 can detect or discover a natural object included in the structure.

Figure 3:
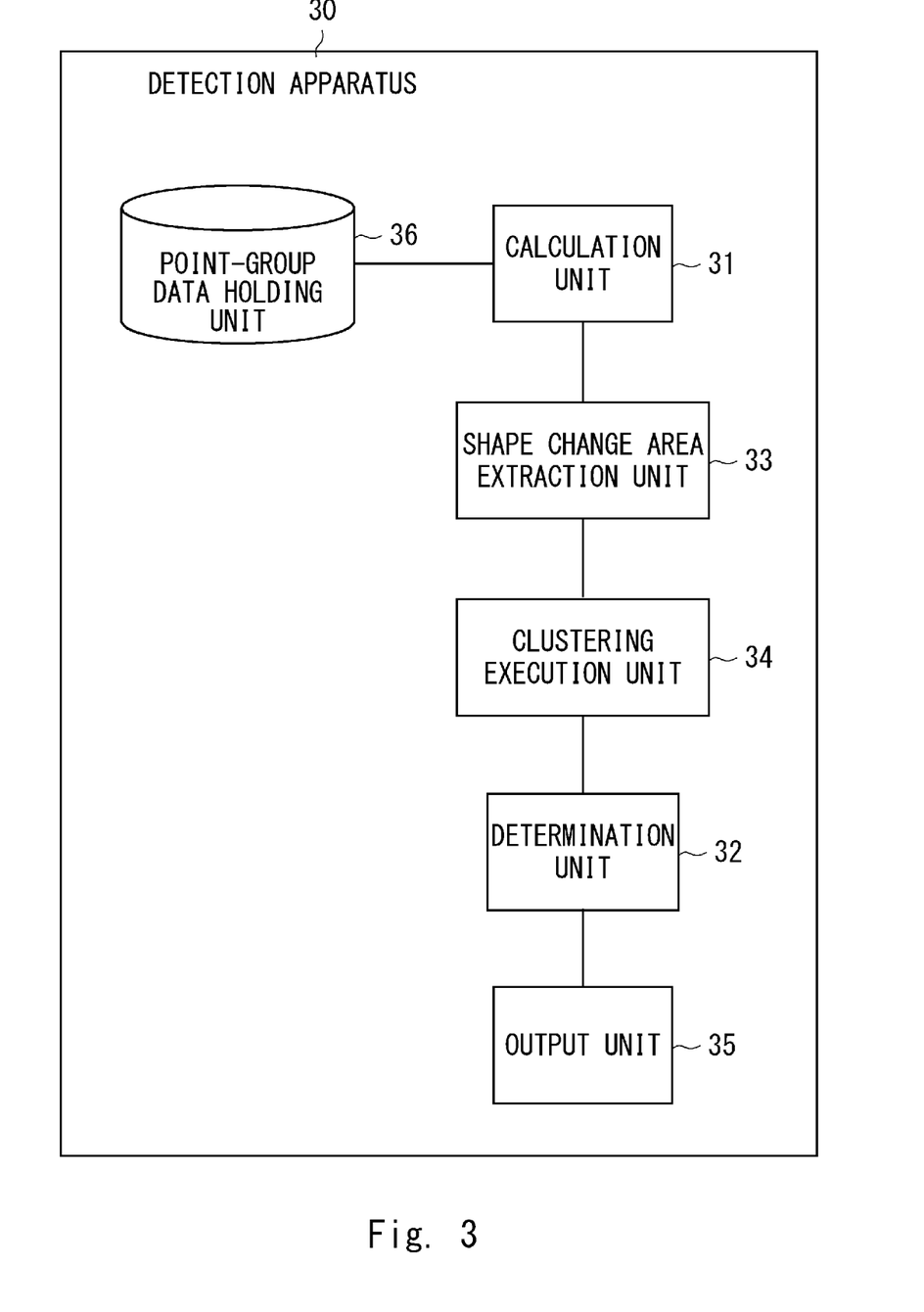
FIG. 3 is a configuration diagram of a detection apparatus according to a second example embodiment.
Figure 9:
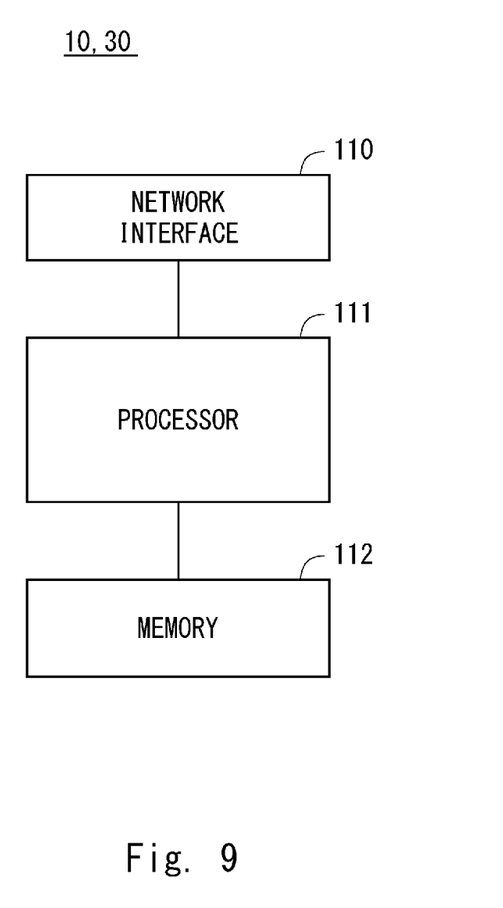
FIG. 9 is a configuration diagram of a detection apparatus according to each example embodiment.

Next, an example of a configuration of each of the detection apparatus 10 and the detection apparatus 30 (hereinafter referred to as the detection apparatus 10 or the like) that have been described in the above-described plurality of example embodiments and shown in FIGS. 1 and 3 is described hereinafter with reference to FIG. 9. FIG. 9 is a block diagram showing an example of a configuration of the detection apparatus 10 or the like. Referring to FIG. 9, the detection apparatus 10 or the like includes a network interface 110, a processor 111, and a memory 112. The network interface 110 is used to communicate with other network node apparatuses constituting a communication system. The network interface 110 may include, for example, a network interface card (NIC) in conformity with IEEE 802.3 series.

The processor 111 performs the process of the decoder described above with reference to the flowchart in the above-described example embodiments by loading software (a computer program) from the memory 112 and executing the loaded software. The processor 111 may be, for example, a microprocessor, an MPU (Micro Processing Unit), or a CPU (Central Processing Unit). The processor 111 may include a plurality of processors.

The memory 112 is composed of a combination of a volatile memory(ies) and a nonvolatile memory(ies). The memory 112 may include a storage that is disposed remotely from the processor 111. In such a case, the processor 111 may access the memory 112 through an I/O (Input/Output) interface (not shown).

In the example shown in FIG. 9, the memory 112 is used to store a group of software modules. The processor 111 can perform the process of the decoder described in the above-described example embodiments by loading the group of software modules from the memory 112 and executing the loaded group of software modules.

As described above with reference to FIG. 9, each of processors included in the detection apparatus 10 or the like executes one or a plurality of programs including a group of instructions in order to cause a computer to perform the algorithm described above with reference to the drawings.

In the above-described examples, the program can be stored and given to a computer using any type of non-transitory computer readable media. Non-transitory computer readable media include any type of tangible storage media. Examples of non-transitory computer readable media include magnetic storage media, optical magnetic storage media, CD-ROM (compact disc read only memory), CD-R, CD-R/W, and semiconductor memories. Examples of the magnetic storage media include flexible disks, magnetic tapes, and hard disk drives. Examples of the optical magnetic storage media include magneto-optical disks. Examples of the semiconductor memories include mask ROM, PROM (programmable ROM), EPROM (Erasable PROM), flash ROM, and RAM (random access memory). Further, the program may be given to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments, and they can be modified as appropriate without departing from the spirit and scope of the present disclosure.

The whole or part of the embodiments disclosed above can be described as, but not limited to, the following supplementary notes.

(Supplementary Note 1)

A detection apparatus comprising:

calculation means for calculating a normal vector for each point included in point-group data indicating a distance to an object to be determined by using the point-group data; and determination means for determining whether the object to be determined is a natural object or not by using a distribution state of at least either horizontal components of the normal vectors or vertical components thereof.

(Supplementary Note 2)

The detection apparatus described in Supplementary note 1, wherein the determination means is configured to specify a distribution tendency of at least either the horizontal components of the normal vectors or the vertical components thereof, and determines whether the object to be determined is a natural object or not by using the distribution tendency.

(Supplementary Note 3)

The detection apparatus described in Supplementary note 1 or 2, wherein the determination means is configured to generate a histogram in which the horizontal components or the vertical components of the normal vectors are associated with the numbers of points distributed in the horizontal components or the vertical components, and determines whether the object to be determined is a natural object or not by using the distribution tendency of the points in the histogram.

(Supplementary Note 4)

The detection apparatus described in Supplementary note 3, wherein the determination means is configured to determine that the object to be determined is a natural object when the number of peaks exceeds a predetermined value, and determines that the object to be determined is a structure when the number of peaks does not exceed the predetermined value, each of the peaks being a part where points are concentrated in the histogram.

(Supplementary Note 5)

The detection apparatus described in Supplementary note 3, wherein the determination means is configured to determine that the object to be determined is a natural object when a variance of the histogram exceeds a predetermined value, and determines that the object to be determined is a structure when the variance does not exceed the predetermined value.

(Supplementary Note 6)

The detection apparatus described in Supplementary note 3, wherein the determination means is configured to determine that the object to be determined is a natural object when a degree of coincidence between a distribution tendency of the points in the histogram and a predetermined distribution model does not exceed a predetermined value, and determines that the object to be determined is a structure when the degree of coincidence exceeds the predetermined value.

(Supplementary Note 7)

The detection apparatus described in Supplementary note 1 or 2, wherein the determination means is configured to calculate a correlation coefficient based on a distribution state of the horizontal components and the vertical components of the normal vectors, and determines whether the object to be determined is a natural object or not by using the correlation coefficient.

(Supplementary Note 8)

The detection apparatus described in any one of Supplementary notes 1 to 7, wherein
the calculation means is configured to calculate a curvature by using the normal vectors, and
the determination means is configured to determine whether the object to be determined is a natural object or not by using a distribution state of at least either horizontal components of normal vectors for points of which the degree of change in curvature is larger than a predetermined value or vertical components thereof.

(Supplementary Note 9)

A determination method performed in a detection apparatus, the determination method comprising:
calculating a normal vector for each point included in point-group data indicating a distance to an object to be determined by using the point-group data; and
determining whether the object to be determined is a natural object or not by using a distribution state of at least either horizontal components of the normal vectors or vertical components thereof.

(Supplementary Note 10)

The determination method described in Supplementary note 9, wherein when it is determined whether the object to be determined is a natural object or not, a distribution tendency of at least either the horizontal components of the normal vectors or the vertical components thereof is specified, and it is determined whether the object to be determined is the natural object or not by using the distribution tendency.

(Supplementary Note 11)

The determination method described in Supplementary note 9 or 10, wherein when it is determined whether the object to be determined is a natural object or not, a histogram in which the horizontal components or the vertical components of the normal vectors are associated with the numbers of points distributed in the horizontal components or the vertical components is generated, and it is determined whether the object to be determined is the natural object or not by using a distribution tendency of the points in the histogram.

(Supplementary Note 12)

The determination method described in Supplementary note 11, wherein when it is determined whether the object to be determined is a natural object or not, it is determined that the object to be determined is the natural object when the number of peaks exceeds a predetermined value, and it is determined that the object to be determined is a structure when the number of peaks does not exceed the predetermined value, each of the peaks being a part where points are concentrated in the histogram.

(Supplementary Note 13)

The determination method described in Supplementary note 11, wherein when it is determined whether the object to be determined is a natural object or not, it is determined that the object to be determined is the natural object when a variance of the histogram exceeds a predetermined value, and it is determined that the object to be determined is a structure when the variance does not exceed the predetermined value.

(Supplementary Note 14)

The determination method described in Supplementary note 11, wherein when it is determined whether the object to be determined is a natural object or not, it is determined that the object to be determined is the natural object when a degree of coincidence between a distribution tendency of the points in the histogram and a predetermined distribution model does not exceed a predetermined value, and it is determined that the object to be determined is a structure when the degree of coincidence exceeds the predetermined value (Supplementary Note 15)

The determination method described in Supplementary note 9 or 10, wherein when it is determined whether the object to be determined is a natural object or not, a correlation coefficient is calculated based on a distribution state of the horizontal components and the vertical components of the normal vectors, and it is determined whether the object to be determined is the natural object or not by using the correlation coefficient.

(Supplementary Note 16)

The determination method described in any one of Supplementary notes 9 to 15, wherein
- a curvature is calculated by using the normal vectors after the normal vectors are calculated, and
- when it is determined whether the object to be determined is a natural object or not, a distribution state of at least either horizontal components of normal vectors for points of which the degree of change in curvature is larger than a predetermined value or vertical components thereof is used.

(Supplementary Note 17)

A non-transitory computer readable medium storing a program for causing a computer to:
- calculate a normal vector for each point included in point-group data indicating a distance to an object to be determined by using the point-group data; and
- determine whether the object to be determined is a natural object or not by using a distribution state of at least either horizontal components of the normal vectors or vertical components thereof.

REFERENCE SIGNS LIST

10 DETECTION APPARATUS
11 CALCULATION UNIT
12 DETERMINATION UNIT
20 OBJECT
30 DETECTION APPARATUS
31 CALCULATION UNIT
32 DETERMINATION UNIT
33 SHAPE CHANGE AREA EXTRACTION UNIT
34 CLUSTERING EXECUTION UNIT
35 OUTPUT UNIT
36 POINT-GROUP DATA HOLDING UNIT

What is claimed is:

1. A detection apparatus comprising:
    a device configured to acquire point-group data indicating a distance to an object;
    at least one memory storing instructions; and
    at least one processor configured to execute the instructions to:
        calculate a normal vector for each point included in the point-group data indicating the distance to the object to be determined by using the point-group data;
        determine whether the object to be determined is a natural object or not by using a distribution state of at least either horizontal components of the normal vectors or vertical components thereof;
        generate a histogram in which the horizontal components or the vertical components of the normal vectors are associated with the numbers of points distributed in the horizontal components or the vertical components; and
        determine whether the object to be determined is a natural object or not by using the distribution tendency of the points in the histogram.

2. The detection apparatus according to claim 1, wherein the at least one processor is further configured to execute the instructions to specify a distribution tendency of at least either the horizontal components of the normal vectors or the vertical components thereof, and determine whether the object to be determined is a natural object or not by using the distribution tendency.

3. The detection apparatus according to claim 1, wherein the at least one processor is further configured to execute the instructions to determine that the object to be determined is a natural object when a number of peaks exceeds a predetermined value, and determine that the object to be determined is a structure when the number of peaks does not exceed the predetermined value, each of the peaks being a part where points are concentrated in the histogram.

4. The detection apparatus according to claim 1, wherein the at least one processor is further configured to execute the instructions to determine that the object to be determined is a natural object when a variance of the histogram exceeds a predetermined value, and determine that the object to be determined is a structure when the variance does not exceed the predetermined value.

5. The detection apparatus according to claim 1, wherein the at least one processor is further configured to execute the instructions to determine that the object to be determined is a natural object when a degree of coincidence between a distribution tendency of the points in the histogram and a predetermined distribution model does not exceed a predetermined value, and determine that the object to be determined is a structure when the degree of coincidence exceeds the predetermined value.

6. The detection apparatus according to claim 1, wherein the at least one processor is further configured to execute the instructions to calculate a correlation coefficient based on a distribution state of the horizontal components and the vertical components of the normal vectors, and determine whether the object to be determined is a natural object or not by using the correlation coefficient.

7. The detection apparatus according to claim 1, wherein the at least one processor is further configured to execute the instructions to:
    calculate a curvature by using the normal vectors; and
    determine whether the object to be determined is a natural object or not by using a distribution state of at least either horizontal components of normal vectors for points of which the degree of change in curvature is larger than a predetermined value or vertical components thereof.

8. A determination method performed in a detection apparatus, the determination method comprising:
    acquiring, by a device, point-group data indicating a distance to an object;
    calculating a normal vector for each point included in the point-group data indicating the distance to the object to be determined by using the point-group data;
    determining whether the object to be determined is a natural object or not by using a distribution state of at least either horizontal components of the normal vectors or vertical components thereof;
    generating a histogram in which the horizontal components or the vertical components of the normal vectors are associated with the numbers of points distributed in the horizontal components or the vertical components; and
    determining whether the object to be determined is the natural object or not by using a distribution tendency of the points in the histogram.

9. The determination method according to claim 8, wherein when it is determined whether the object to be determined is a natural object or not, a distribution tendency of at least either the horizontal components of the normal vectors or the vertical components thereof is specified, and it is determined whether the object to be determined is the natural object or not by using the distribution tendency.

10. The determination method according to claim 8, wherein when it is determined whether the object to be determined is a natural object or not, it is determined that the object to be determined is the natural object when a number of peaks exceeds a predetermined value, and it is determined that the object to be determined is a structure when the number of peaks does not exceed the predetermined value, each of the peaks being a part where points are concentrated in the histogram.

11. The determination method according to claim 8, wherein when it is determined whether the object to be determined is a natural object or not, it is determined that the object to be determined is the natural object when a variance of the histogram exceeds a predetermined value, and it is determined that the object to be determined is a structure when the variance does not exceed the predetermined value.

12. The determination method according to claim 8, wherein when it is determined whether the object to be determined is a natural object or not, it is determined that the object to be determined is the natural object when a degree of coincidence between a distribution tendency of the points in the histogram and a predetermined distribution model does not exceed a predetermined value, and it is determined that the object to be determined is a structure when the degree of coincidence exceeds the predetermined value.

13. The determination method according to claim 8, wherein when it is determined whether the object to be determined is a natural object or not, a correlation coefficient is calculated based on a distribution state of the horizontal components and the vertical components of the normal vectors, and it is determined whether the object to be determined is the natural object or not by using the correlation coefficient.

14. The determination method according to claim 8, wherein a curvature is calculated by using the normal vectors after the normal vectors are calculated, and
wherein, when it is determined whether the object to be determined is a natural object or not, a distribution state of at least either horizontal components of normal vectors for points of which the degree of change in curvature is larger than a predetermined value or vertical components thereof is used.

15. A non-transitory computer readable medium storing a program for causing a computer to:
acquiring, by a device, point-group data indicating a distance to an object;
calculate a normal vector for each point included in the point-group data indicating the distance to the object to be determined by using the point-group data;
determine whether the object to be determined is a natural object or not by using a distribution state of at least either horizontal components of the normal vectors or vertical components thereof;
generating a histogram in which the horizontal components or the vertical components of the normal vectors are associated with the numbers of points distributed in the horizontal components or the vertical components; and
determining whether the object to be determined is the natural object or not by using a distribution tendency of the points in the histogram.

* * * * *